Jan. 27, 1959

H. CORREC 2,870,680

DEVICE FOR THE CONTROL OF THE BREECH OF
A DOUBLE-BARRELLED GUN

Filed Jan. 31, 1956

INVENTOR

Henri Correc

BY Cameron, Kerkam & Sutton
ATTORNEYS

Jan. 27, 1959

H. CORREC 2,870,680

DEVICE FOR THE CONTROL OF THE BREECH OF
A DOUBLE-BARRELLED GUN

Filed Jan. 31, 1956

INVENTOR
Henri Correc

BY Cameron, Kerkam & Sutton
ATTORNEYS

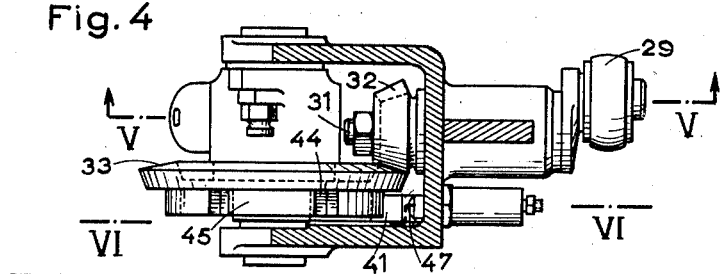
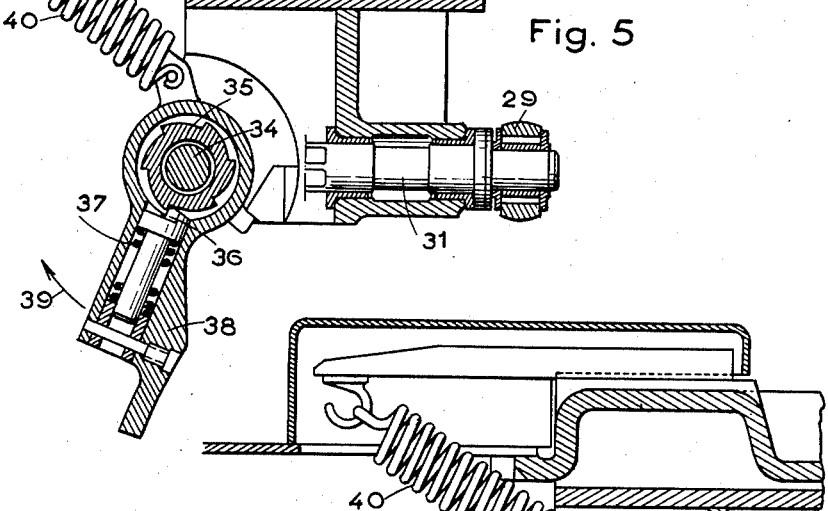
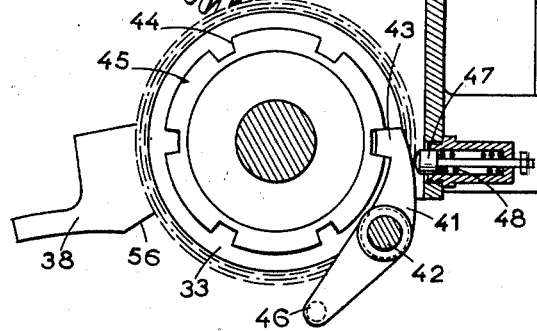

Jan. 27, 1959

H. CORREC 2,870,680

DEVICE FOR THE CONTROL OF THE BREECH OF A DOUBLE-BARRELLED GUN

Filed Jan. 31, 1956

INVENTOR

*Henri Correc*

BY *Cameron, Kerkam & Sutton*
ATTORNEYS

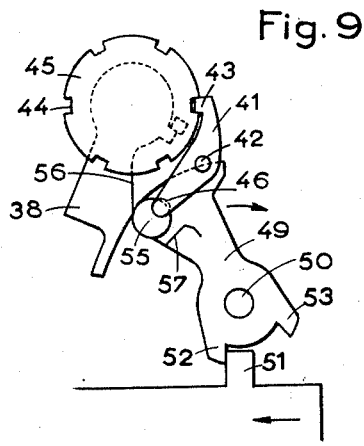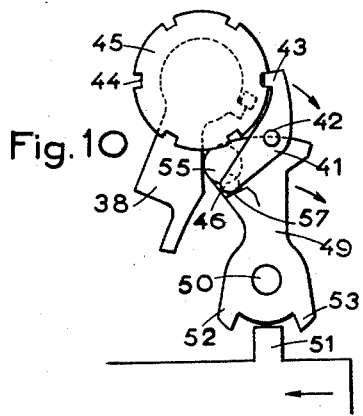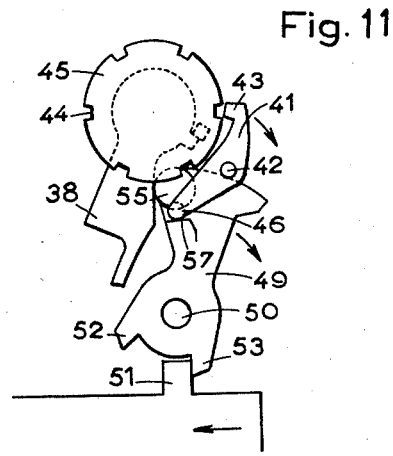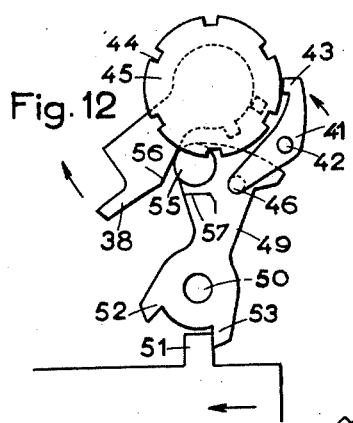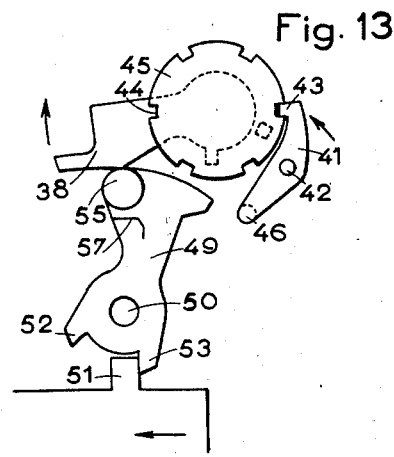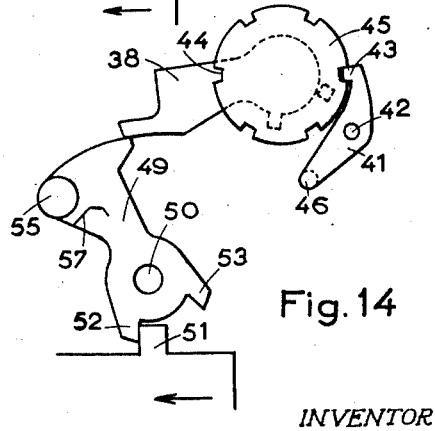
INVENTOR
Henri Correc
BY Cameron, Kerkam & Sutton
ATTORNEYS INVENTOR
Henri Correc
BY
Cameron, Kerkam & Sutton
ATTORNEYS Jan. 27, 1959
H. CORREC
2,870,680
DEVICE FOR THE CONTROL OF THE BREECH OF
A DOUBLE-BARRELLED GUN
Filed Jan. 31, 1956
8 Sheets-Sheet 7
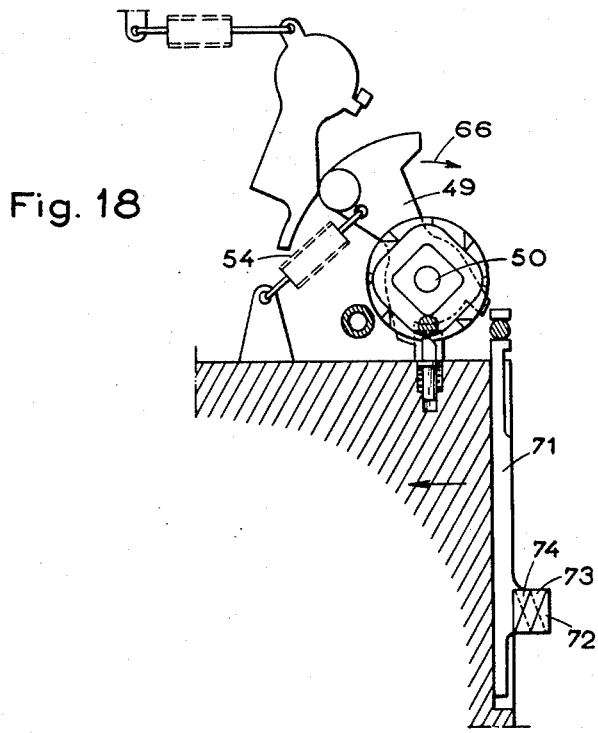
Fig. 18
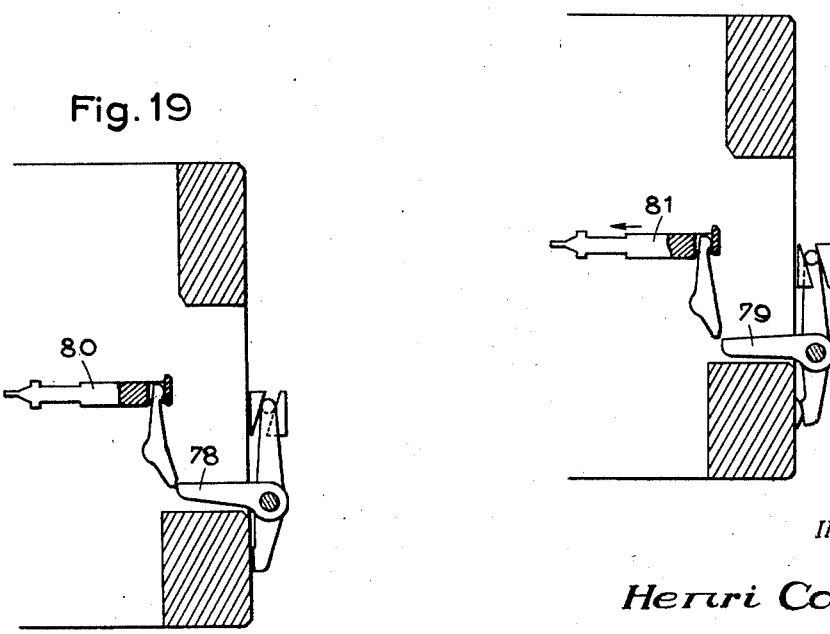
Fig. 19
Fig. 20
INVENTOR
*Henri Correc*
BY
*Cameron, Kerkam & Sutton*
ATTORNEYS Jan. 27, 1959
H. CORREC
2,870,680
DEVICE FOR THE CONTROL OF THE BREECH OF
A DOUBLE-BARRELLED GUN
Filed Jan. 31, 1956
8 Sheets-Sheet 8
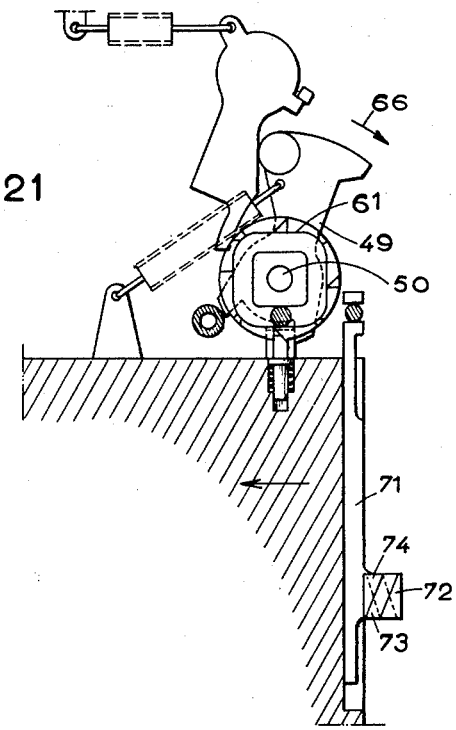
Fig. 21
Fig. 23
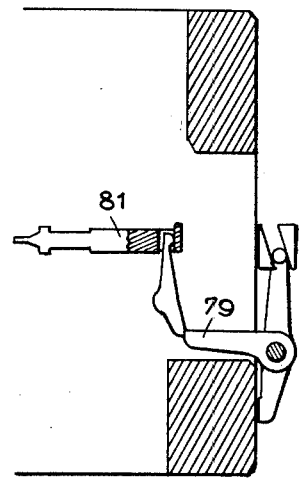
Fig. 22
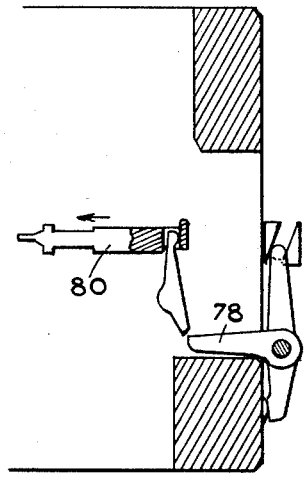
INVENTOR
*Henri Correc*
BY
*Cameron, Kerkam & Sutton*
ATTORNEYS United States Patent Office 2,870,680
Patented Jan. 27, 1959

2,870,680

DEVICE FOR THE CONTROL OF THE BREECH OF A DOUBLE-BARRELLED GUN

Henri Correc, Paris, France, assignor to Societe des Forges et Ateliers du Creusot, Paris, France Application January 31, 1956, Serial No. 562,564

Claims priority, application France February 3, 1955

9 Claims. (Cl. 89—17)

This invention relates to the control of the breech of a double-barrelled gun the barrels of which must not be fired simultaneously but have to be fired successively, although the gun has a breech in common to both barrels and consequently the barrels recoil at the same time.

The device according to the invention assures the opening and closing of the portions of the breech, corresponding to the two barrels and the inversion of the locking device when firing.

According to the invention the device comprises a carriage including two cam assemblies, each assembly corresponding to the portion of the breech of a single barrel, this carriage being slidably mounted in a plane above the axes of the barrels and parallel to the plane of these axes, in such a manner that either of these two cam assemblies may come into the path of control levers of the portion of the breech of the corresponding barrel, the other assembly being removed from the path of the levers corresponding to the other barrel, an eccentric actuated by an invertor mechanism carried by the breech determining the sliding movements of the carriage in order to permit the portion of the breech corresponding to one barrel or the other to act on the control levers.

The invention will now be described in more detail with reference to a specific embodiment given by way of example.

In the course of the following description supplementary features of the invention will become clear, in particular as regards the change-over of the firing.

Figure 4 is a section on line IV—IV of Figure 1;

Figure 5 is a section on line V—V of Figure 4;

Figure 6 is a section on line VI—VI of Figure 4;

Figures 9 to 14 illustrate the various phases of co-operation of the change over mechanism carried by the breech, and control finger of the eccentric in the course of bringing the gun back into the firing position;

Figures 16 to 18 represent the co-operation of the change over mechanism and of the control finger of the eccentric during the recoil and the restoring of the gun to the firing position, with the control device for the inversion of the firing;

Figures 19 and 20 are diagrammatic vertical sections along the axes of the left and right barrels respectively, showing the position of the breech bolt corresponding to each of the barrels during the phases of operations shown in the Figures 16 to 18;

Figure 21 represents the end of the first third of the stroke of return of the gun to the firing position, a phase following that shown in Figure 18;

Figures 22 and 23 represent the positions of the breech bolts of the left and right barrels, respectively, corresponding to Figure 21.

Figure 1:
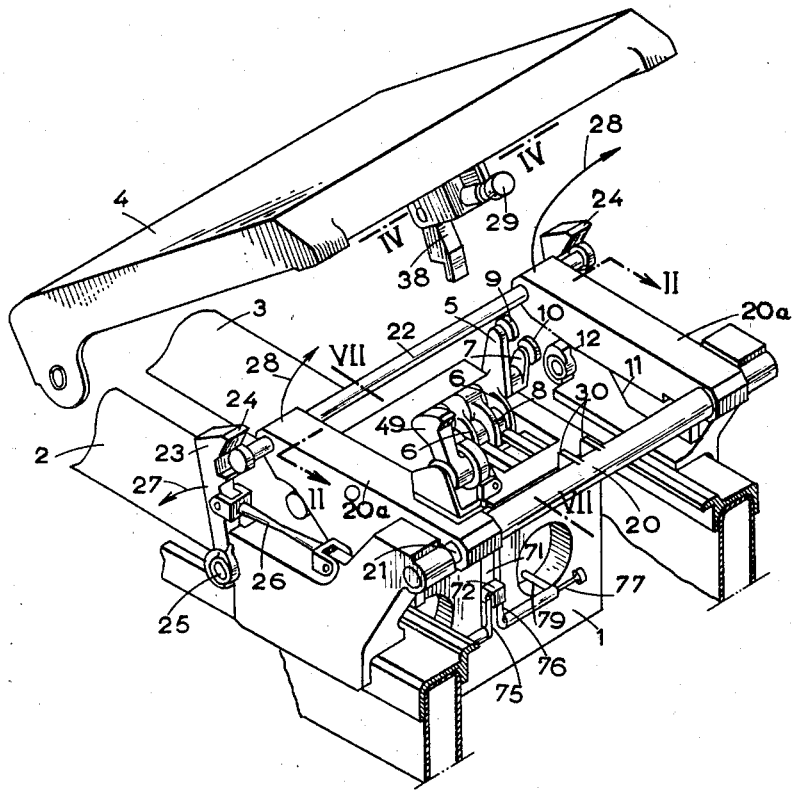
Figure 1 is a diagrammatic view of the part of the gun comprising the breech, the two barrels being shown in part, and the cover of the casing enclosing the breech being half raised, the casing itself not being shown.

The gun illustrated in Figure 1 comprises a common breech 1 which is shared by the two barrels 2 and 3.

This breech moves in a casing (not shown) closed by a cover 4.

In Figure 1 the cover 4 is shown half open.

The portion of the breech 1 which corresponds to each of the barrels, comprises a lever 5 controlling and actuating the extractor 6, and a lever 7 controlling and actuating another lever 8 which acts on and actuates the closure wedge.

The lever 5 carries a roller 9, and the lever 7 a roller 10.

The levers 5 and 7 shown in Figure 1 are those which correspond to the right barrel.

The breech comprises a second set of levers symmetrical with respect to the vertical plane which is equidistant from the two barrels, this second set of levers not being seen in Figure 1, because it is hidden by certain parts of the gun.

By swinging the lever 7, the opening of the breech is effected, and by swinging the lever 5 the detaching of the spent cartridge is effected.

The levers are operated by cams 11 and 12 lying under frame 20a. In the course of the recoil of the breech, the roller 10 of the lever 7 rolls upon the cam 11, and the lever 7 rocks, and thereby effects the lifting of the breech closure wedge 13. At the same time the roller 9 rolls upon the cam 12 and the lever 5 rocks, thereby effecting the detaching of the spent cartridge. At this moment, a finger 85 which projects from each of the lateral faces of the wedge 13 hits a spur 86 carried by each of the branches of the ejector, and effects the extraction of the spent cartridge.

Figure 3:
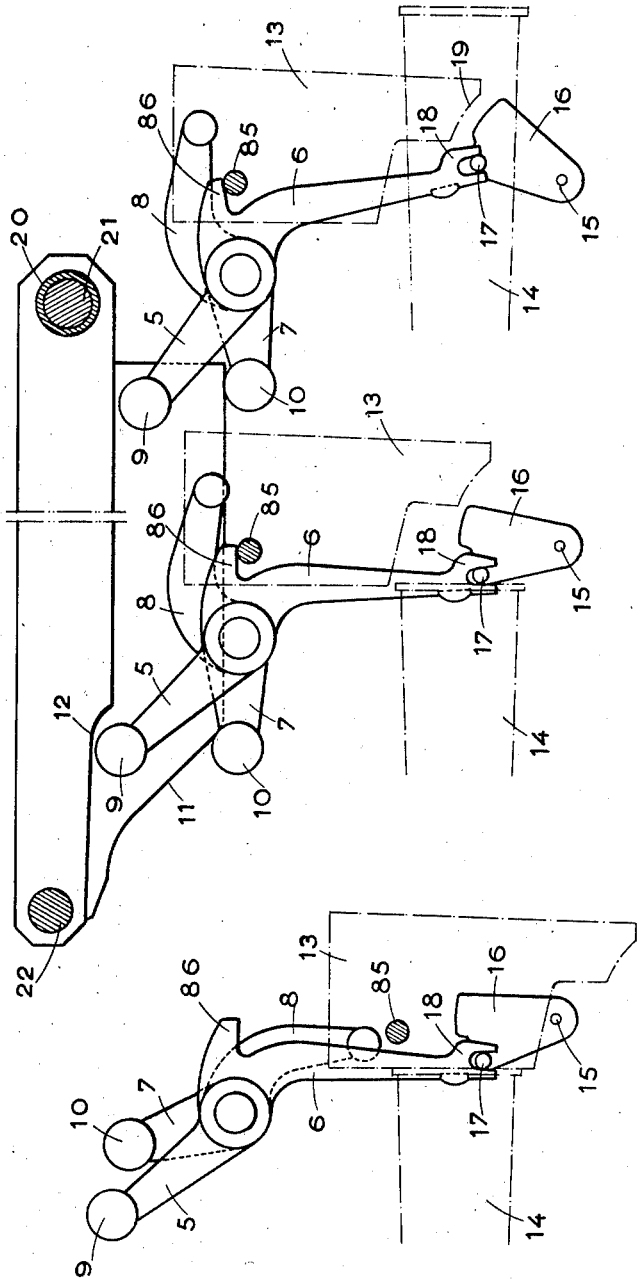
Figure 3 illustrates diagrammatically an assembly of two cams, and three successive positions of the lever controlling the opening of the breech and of the lever controlling the extractor, in the course of a recoil of the gun.

The different phases of the recoil are illustrated in Figure 3. At the beginning of the recoil, the wedge 13 closes the breech.

In the course of the recoil, the cam 11 has rocked the lever 7, and the wedge 13 is lifted. During this phase the cam 12 rocks the lever 5, and the branches of the extractor 6 begin to detach the spent cartridge 14 by rocking a pivotally mounted abutment 16 about an axle 15. The abutment 16 carries a centre pin 17 which is moved by a fork 18 which forms the lower end portion of the extractor.

At the end of the recoil, the wedge 13 has been raised to a maximum, and the abutment 16, rotated by the extractor, carries under a portion 19 of the wedge 13 which in the course of return of the gun to the firing condition rests upon the abutment 16.

When the return of the gun to the firing position is completed, the wedge 13 remains in the raised position, and the extractor 6 keeps in the raised position seen at the right of Figure 3.

The loading of a new cartridge 14 into the barrel returns extractor 6 to the position seen at the left of Figure 3, and effects the retraction of the abutment 16 and the closing of the breech by the wedge 13. The breech is biased toward its closed position by a device such as a torsion bar (not shown).

The function of the levers 5 and 7 described hereinabove with reference to Figure 3 acts on the two barrels 2 and 3 in succession only. The consecutive operations of the portions of the breech corresponding to the two barrels are effected, according to the present invention, by the slidable mounting of the two cam assemblies.

The two frames 20a are interconnected by a spacer tube 20 traversed by an axle 21.

The frames 20a are traversed by an axle 22 upon which they can slide.

Figure 2:
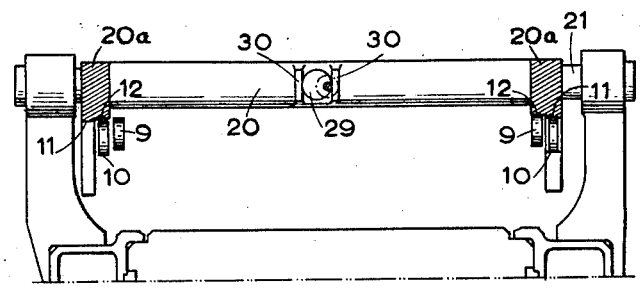
Figure 2 is a diagrammatic section on the line II—II of Figure 1, showing the position of rollers carried by the opening levers of the breech and the control of the ejectors, with respect to the cams of the movable equipment.

The carriage 20—20a carrying the two cam assemblies, i. e., the assembly of the cams 11 and 12 associated with the right barrel, and the one associated with the left barrel, is displaced either to the right or to the left as seen in Fig. 2. The cams 11 and 12 may accordingly move into the path of the rollers 9 and 10 of the levers 5 and 7, or may be withdrawn from such path. In the latter case the cams do not control the rocking of the levers 5 and 7 of the corresponding portion of the breech.

Figure 2 shows, as seen from the left in Fig. 1, the carriage 20—20a of the two cam assemblies moved to the right gun barrel (on the left side of this figure). In this case the cams 11 and 12 associated with the control of the portion of the breech of the left gun barrel (seen on the right of Fig. 2) are those on which the rollers 9 and 10 can roll.

The gun includes a safety device, which prevents damage to the rollers 9 and 10, of the levers 5 and 7, and to the cams 11 and 12, when for any reason there arises an abnormal resistance to the rocking of the lever 5 or of the lever 7. This safety device includes the levers 23 which end in hooks retaining the axle 22. The levers 23 are pivotally mounted on axles 25, and are normally retained by breaking links 26 in such a position that they fix the position of the axle 22.

When an abnormal resistance prevents the rocking of the levers 5 and 7, the breaking links 26 snap, the levers 23 rock in the direction of the arrow 27, and the carriage 20—20a and its associated cams rises in the direction of the arrows 28, rocking about the axle 21. The abnormal resistance to the rocking of the levers 5 and 7 may then be eliminated, and carriage 20—20a and the cams returned to normal position, and breaking links 26 replaced.

The control of the sliding or reciprocation of the carriage 20—20a on the axles 21 and 22 is effected by means for reciprocating the carriage 20—20a on the axles 21 and 22 including an eccentric roller 29 mounted between two plates 30 which are fixed to the spacer piece 20.

The roller 29 is eccentric with respect to the axle 31 of a pinion 32 which is in mesh with a pinion 33.

The pinions are bevelled in such a manner as to include a right angle between their axes.

The pinion 33 is keyed on an axle 34 of a lever and ratchet mechanism having ratchet wheel 35 co-operating with a pawl 36 which is biased by a spring 37.

The pawl 36 is mounted in a pivotally mounted finger 38. When the finger 38 turns in the direction of the arrow 39, the pawl 36 rotates the ratchet wheel 35 and the pinion 32. Pinion 32 rotates the eccentric 29. This action slides carriage 20—20a of the two cam assemblies on the axles 21 and 22.

A spring 40 returns the finger 38 by turning the same in the direction opposite to the arrow 39. During this rotation the pawl 36 rises on the corresponding ramp of the ratchet wheel 35 without rotating the same, owing to a latch means for locking said lever and ratchet mechanism against rotation illustrated in Figures 4 and 6.

This latch comprises a lever 41 which is mounted pivotally about an axle 42 and the end of which has a beak 43 engaging in notches 44 provided in the periphery of a disc 45 which is fixed to the pinion 33.

The lever 41 is extended on the other side of the axle 42, and carries a roller 46 the function of which will be explained later.

A pusher member 47 subject to the action of a spring 48 biases the beak 43 of the lever 41 into one of the notches 44.

The eccentric 29 and the finger 38 are carried by the cover 4 of the casing of the breech. The breech itself carries a change-over mechanism illustrated in the Figures 7 and 8. This change-over mechanism comprises a lever 49 which during displacement of the breech acts on finger 38.

The lever 49 swings about an axle 50 and its oscillations are limited by an abutment 51 fixed to the breech which co-operates with two shoulders 52 and 53 forming part of the lever 49.

Figure 7:
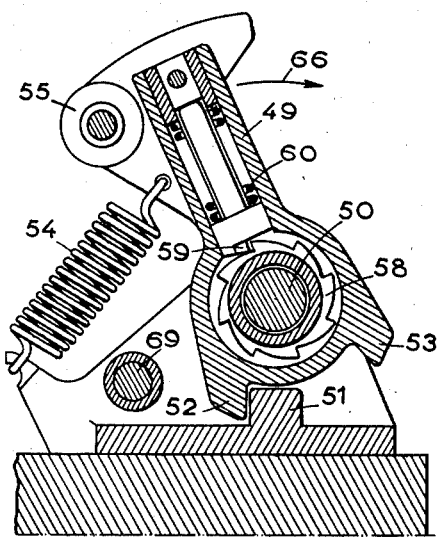
Figure 7 is a section on line VII—VII of Figure 1.
Figure 8:
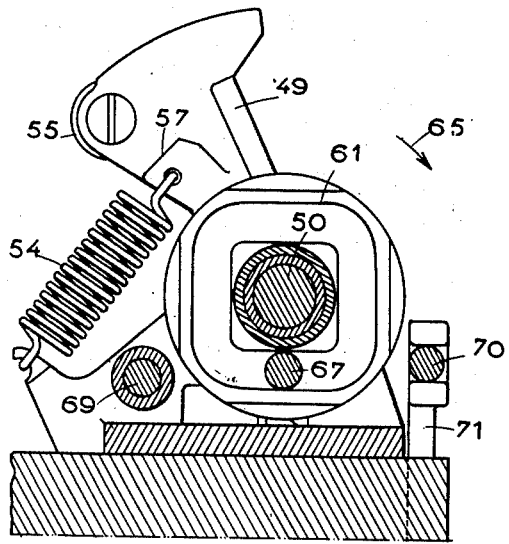
Figure 8 is an elevation of the change over mechanism carried by the breech, and shown in section in Figure 7.

A spring 54 biases lever 49 toward the gun muzzles and toward the left as seen in Fig. 7.

The Figures 9 to 14 illustrate the functioning of the change-over mechanism when the gun returns to the firing position.

At the beginning of the return of the gun to firing position, the roller 55 comes into contact with a ramp 56 provided on the finger 38. Since the finger 38 is locked by the beak 43, the lever 49 rotates to the position illustrated in Figure 10. At this moment an abutment 57 of the lever 49 comes into contact with the roller 46 of the lever 41. While the lever 49 continues to rotate as illustrated in Figure 11, the abutment 57 bears on the roller 46 and rotates lever 41, releasing the pivotally mounted finger 38. The lever 49 comes to rest in the position shown in Figure 11, since the shoulder 53 has come into contact with the stop 51. The roller 55 of the lever 49 then moves upon the cam 56, rotating the lever 38. Simultaneously the roller 46 escapes from the abutment 57, and the beak 43 moves over the periphery of the disc 45 until it enters a new notch 44. The rotation of pinion 33 is stopped, and the rotation of eccentric 29 stops.

During the movements described hereinabove the carriage 20—20a for the two cam assemblies was sliding on the axles 21 and 22.

The change-over mechanism of the control means for the opening of the breech and for the ejection of the spent cartridge 14 will now be described.

As seen in Figure 7, an oscillating lever and ratchet mechanism includes a lever 49 and a ratchet wheel 58 mounted on the pivot axle 50 and ratchet wheel 50 co-operates with a pawl 59 biased by a spring 60.

Figure 15:
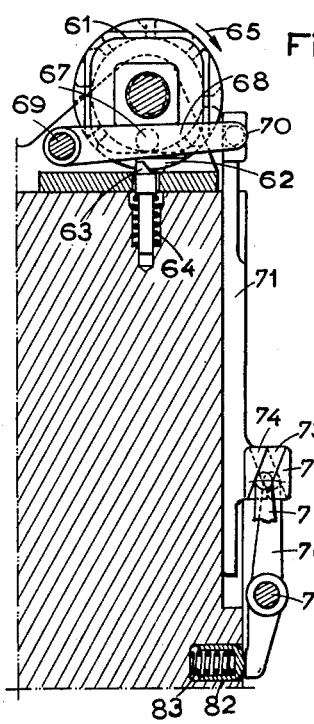
Figure 15 is a longitudinal part-section on a vertical plane which contains the axis of the breech showing the control of the change over for the firing, starting from the invertor mechanism illustrated in Figure 8.

The ratchet wheel 58 is fixed to a cam 61 of the change-over mechanism for the firing pins, and to a toothed disc 62. These members are illustrated in Figure 15.

The toothed disc 62 is restrained by a pusher member 63 subject to the action of a spring 64.

The teeth of the disc 62 and the pusher 63 are so shaped that the disc 62 can turn only in the direction of the arrow 65, when lever 49 rotates in the direction of the arrow 66 (Fig. 7), and the pawl 59 rotates the ratchet wheel 58.

The disc 62 has eight teeth, as does the ratchet wheel 58. The permissible oscillation of the lever 49 is such that for each to-and-fro movement of lever 49 the cam 61 turns through one-eighth of a revolution.

Cam 61 has a square profile with rounded angles; it controls, a pin or cam follower 67; and pin 67 moves away from or towards the axle 50 depending on whether it is located at one of the corners of the square or in the middle of one of its sides. The pin 67 is fixed to a lever 68 rocking about an axle 69. The opposite end of the lever 68 is provided with a roller 70 lodged at the upper portion of a connecting rod 71 sliding vertically at the rear of the breech.

Depending on the position of the pin 67 with respect to the cam 61, the rod 71 will be raised or lowered.

Rod 71 carries a portion or block 72 provided with two ramps 73 and 74 of opposite slope. Ramps 73 and 74 act on levers 75 and 76 pivotally mounted on a horizontal axis 77. Each of levers 75 and 76 is fixed by means of an axle to a firing pin lever 78 or 79 as shown in Figures 19, 20, 22 and 23.

It will be understood that in the course of the oscillation of rod 71 the levers 75 and 76 rock in the opposite sense and that one of the levers controls the locking of its firing pin 80 of one gun barrel while the other lever controls the unlocking of its firing pin 81.

Figure 16:
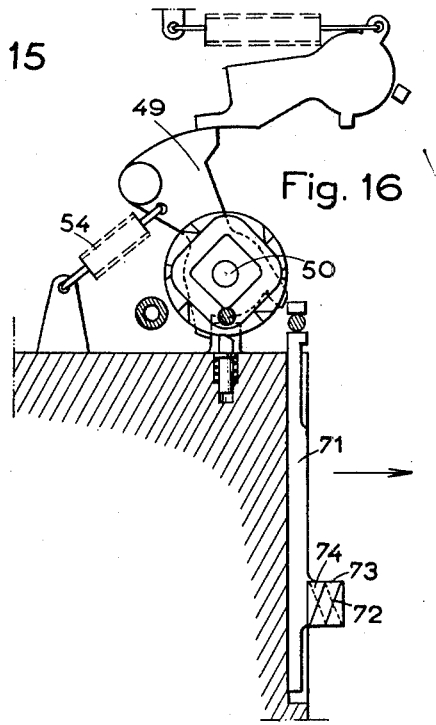
Figure 17:
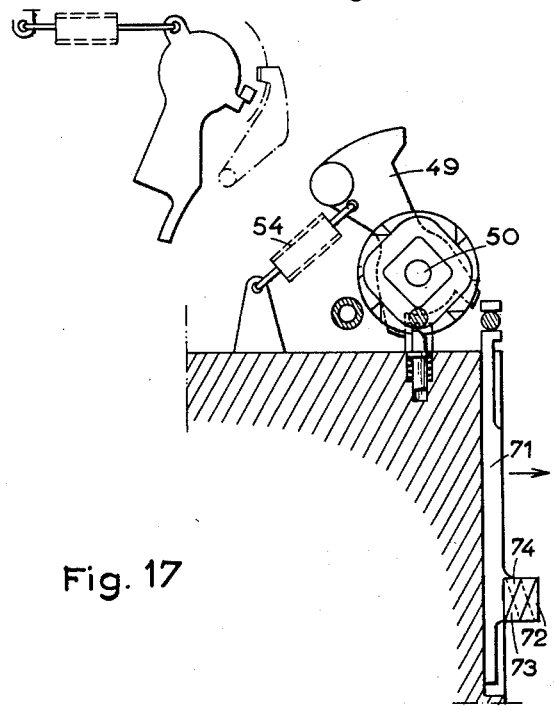

The Figures 16 to 18 illustrate respectively the beginning of the recoil, the recoil in progress, and return to the firing position in progress.

During these movements the lever 49 is biased by its spring 54, it does not rotate the cam 61, and the rod 71 does not move. In the embodiment illustrated rod 71 is in its lowest position, which locks the firing pin 80 by the lever 78 for the left gun barrel (Figure 19), and unlocks firing pin 81 by the lever 79 for the right gun barrel (Figure 20).

Figure 21 represents a more advanced phase of the return to the firing position than is illustrated in Figure 18. The lever 49 is then rocked in the direction of the arrow 66 (Figure 7), and turns cam 61 raising rod 71. The two levers 78 and 79 are turned in opposite directions, and the firing pin 80 of the left gun barrel is unlocked (Figure 22) while the firing pin 81 of the right gun barrel is locked (Figure 23).

A pusher member 82 may be provided which is biased by a spring 83 (Figure 15) for biasing of each of the levers 75 and 76 and to eliminate any play which might have existed in the control of these levers by the ramps 73 and 74.

The device controlling the breech described hereinabove accordingly assures automatically the operation of one barrel or the other. It is of a simple construction, and it can be inspected as often as desired without requiring any complicated dismantling and reassembling.

The invention is not limited to the embodiment described, and might undergo changes in details without departing from the scope of the invention.

What I claim is:

1. In a breech control mechanism, a double-barrelled gun having a common breech, a breech closure wedge for each of said barrels, levers for actuating each of said breech closure wedges, a carriage mounted above and reciprocal over said breech wedges, cams on said carriage for each of said breech closure wedges, means for reciprocating said carriage to alternately bring the corresponding ones of said cams into position to engage said actuating levers for the corresponding one of said breech closure wedges including a rotatable eccentric engaging said carriage and a change-over mechanism moving with said common breech during recoil for rotating said eccentric.

2. In a breech control mechanism, a double-barrelled gun having a common breech, a breech closure wedge for each of said barrels, a cartridge extractor for each of said barrels, a lever for actuating each of said breech closure wedges, a lever for actuating each of said extractors, a carriage mounted above and reciprocal over said breech closure wedges, a cam surface on said carriage for engagement with each of said levers, means for reciprocating said carriage to alternately bring the corresponding ones of said cams into position to engage said levers for the corresponding one of said breech closure wedges including a rotatable eccentric engaging said carriage and a change-over mechanism moving with said common breech during recoil for rotating said eccentric.

3. A mechanism as described in claim 2 including spaced parallel axles receiving said carriage for reciprocal movement and safety means breaking upon the occurrence of abnormal pressures between said cam surfaces and said levers permitting rotation of said carriage about one of said axles.

4. A mechanism as described in claim 2 including a cover extending over said breech closure wedges and over said carriage, said rotatable eccentric being mounted for rotation on and under said cover.

5. In a mechanism as described in claim 2, each of said cartridge extractors being mounted for rotation by the corresponding one of said actuating levers, a pivotally mounted abutment for each of said extractors and rotatable therewith holding the corresponding one of said breech closure wedges open after extraction of a cartridge.

6. In a mechanism as described in claim 2, a lever and ratchet mechanism rotating said eccentric in a single direction, said change-over mechanism engaging and actuating the lever of said lever and ratchet mechanism.

7. In a mechanism as described in claim 6, latch means for locking said lever and ratchet mechanism against rotation, an oscillating lever and ratchet mechanism comprising said change-over mechanism, an abutment on said lever of said second lever and ratchet mechanism for engaging and releasing said latch means, a firing pin for each of said barrels, and a lock for each of said firing pins, said second lever and ratchet mechanism alternately actuating each of said firing pin locks.

8. In a mechanism as described in claim 7, said latch means for locking said lever and ratchet mechanism including a pawl and said abutment on said lever of said second lever and ratchet mechanism for releasing said latch means having a cam surface for engaging and rotating said pawl.

9. In a mechanism as described in claim 7, said second lever and ratchet mechanism for alternately actuating each of said firing pin locks including a cam rotatable in a single direction, a cam follower for said cam, an oscillating block, ramps of opposite inclination on said block, a lever and rod connecting said block and said last named cam through said cam follower, said firing pin locks including levers engaging said ramps whereby movement of said block alternately actuates said firing pin locks.

References Cited in the file of this patent

UNITED STATES PATENTS

| | | |
|---|---|---|
| 1,723,450 | Tomiska | Aug. 6, 1929 |
| 2,333,528 | Ekdahl | Nov. 2, 1943 |

FOREIGN PATENTS

| | | |
|---|---|---|
| 741,947 | Great Britain | Dec. 14, 1955 |